United States Patent [19]
Hammer et al.

[11] Patent Number: 5,586,615
[45] Date of Patent: Dec. 24, 1996

[54] VACUUM PACKAGED ESCAPE SLIDE

[75] Inventors: David R. Hammer, Glendale; Kenneth W. Sego, Jr., Peoria; Lance C. Labun, Tempe, all of Ariz.

[73] Assignee: Simula Inc., Phoenix, Ariz.

[21] Appl. No.: 477,402

[22] Filed: Jun. 7, 1995

[51] Int. Cl.$^6$ ................................................ A62B 1/20
[52] U.S. Cl. .......................................... 182/48; 244/137.2
[58] Field of Search ............................ 182/48; 244/137.2

[56] References Cited

U.S. PATENT DOCUMENTS

| | | | |
|---|---|---|---|
| 2,765,131 | 10/1956 | Boyle. | |
| 3,102,623 | 9/1963 | Schacht et al.. | |
| 3,463,287 | 8/1969 | Smith | 182/48 |
| 3,621,383 | 11/1971 | Rush | 182/48 |
| 3,771,749 | 11/1973 | Smalowicz | 244/137.2 |
| 3,860,984 | 1/1975 | Fisher. | |
| 3,910,532 | 10/1975 | Fischer | 182/48 |

Primary Examiner—Alvin C. Chin-Shue
Attorney, Agent, or Firm—Crowell & Moring

[57] ABSTRACT

The present invention is an environmentally sealed storage and deployment system for inflatable aircraft escape slides which is comprised of an environmentally sealed vacuum bag and an inflatable escape slide. Environmentally sealing the slide protects the slide fabric and components from degradation due to moisture, oxygen, ozone, tobacco smoke, and other deleterious agents. By protecting the slide from degradation in this manner, the time period between routine inspections may be extended. The force generated by the opening of the aircraft door tears open the environmentally sealed bag, initiating the deployment of the inflatable escape slide. The sealed vacuum bag is equipped with air-tight disconnect fittings that make it unnecessary to repack the slide after the changing of the $CO_2$ cylinder or the slide light batteries.

39 Claims, 9 Drawing Sheets

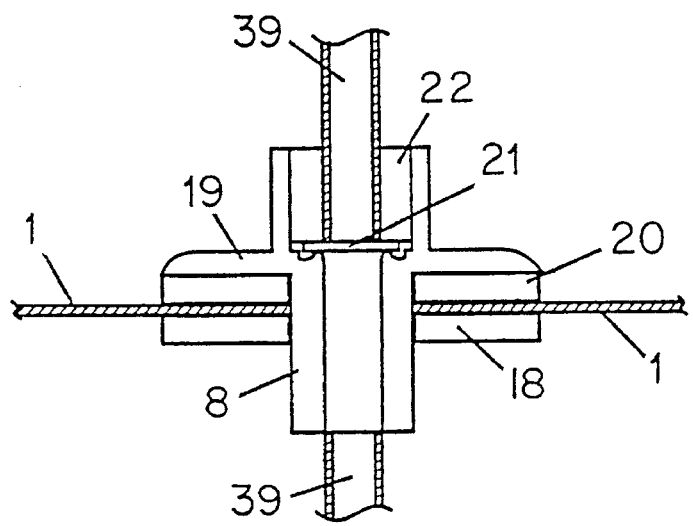
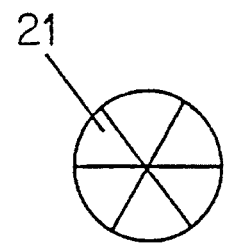
FIG. 6a
FIG. 6b
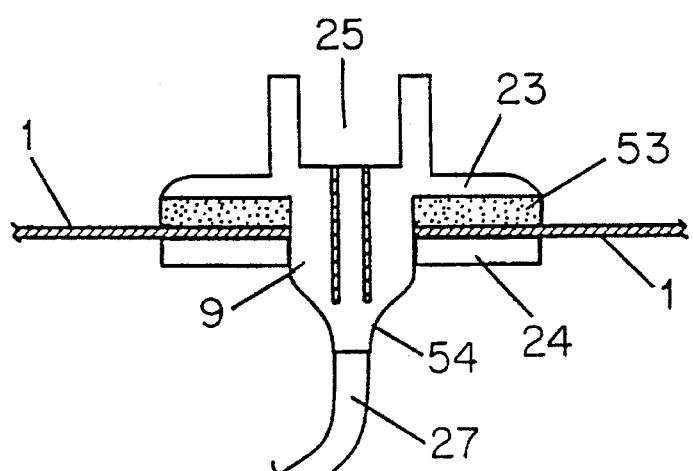
FIG. 7

VACUUM PACKAGED ESCAPE SLIDE

BACKGROUND

1. Field of the Invention

The present invention relates to inflatable escape slides and inflatable slide rafts for use by passengers evacuating aircraft. The slides are environmentally sealed under a vacuum to reduce the overall bulk of the stored slide and to extend the slide's repack interval and overall useful life.

2. Background

Inflatable escape slides are installed in virtually all large passenger-carrying aircraft to provide a rapid means for evacuating passengers in the event of an emergency. Such inflatable escape slides typically include at least one inflatable structural beam member. The slide surface (for use by the evacuating passengers) is provided on the upper side of the structural beam member. The structural beam member is inflated using compressed gas and an aspirator and/or a turbo fan. The upper end of the structural beam member is connected to the bottom of the aircraft's doorway by a girt bar assembly. Prior art inflatable escape slides are disclosed, for example, in U.S. Pat. Nos. 2,765,131, 3,102,623, and 3,860,984.

These inflatable escape slides are normally folded and packed so that they require only a minimal amount of space within the interior of the aircraft. They are typically mounted on the interior of the aircraft door, or immediately adjacent thereto. When the door is closed, the slide is manually connected to brackets on the floor inside the doorway using a girt bar. In the event of an emergency, it is only necessary to open the door so that the girt bar pulls the slide from the package as the door opens, thereby allowing the slide to fall through the doorway. The slide is then inflated and is ready for passenger evacuation.

It is important to minimize the overall dimensions of the packed escape slide. The packed escape slide must be small enough to reliably deploy through the aircraft door when activated. Also, it must not interfere with the normal operation of the door, or with the use of the door by passengers exiting the aircraft.

The packing procedure for inflatable escape slides is generally both time-consuming and labor-intensive. It may require as many as three or four persons. The escape slide is folded in a sequence which will allow reliable inflation and deployment. The folded escape slide is then placed into a relatively shallow receptacle commonly called a packboard. A series of fabric panels, which are attached to the periphery of the packboard are then laced together with cord to contain the folded escape slide between the packboard and the fabric panels. The packed escape slide is then compressed to the desired configuration by manually pressing down the surfaces of the packed assembly and tightening the laces. Alteratively, a vacuum line is applied to the inflatable member(s) of the slide, and the packboard laces are tightened.

Several problems arise with these procedures. First, the inflatable members of the escape slides might be damaged during both the preliminary folding operation and the subsequent compression of the slide. The inflatable members are generally fabricated from a neoprene rubber-coated fabric that may be punctured or torn by hard-surfaced apparatus such as lighting fixtures, survival equipment, inflation devices, or compressed gas reservoirs that are packaged with the escape slide.

Second, compact packaging of the inflatable escape slides is becoming increasingly difficult to achieve due to longer slide lengths (which have been necessary to service wide-bodied aircraft), double-wide slides (which can evacuate 2 streams of people) and the inclusion of more accessories in the slide pack, such as lights, inflatable rafts, and other survival equipment. Compact packaging is especially difficult to achieve in the case of the slide/raft escape units which serve as both slides and life rafts. Slide/rafts are more difficult to pack because they are generally bulkier than standard escape slides, and they include a wide variety of survival and rescue equipment. For example, slide/raft packs can include radio beacons, locator lights and their associated batteries, antennae, hand pumps, anchors, heaving lines, knives, and canopies.

Third, inflatable escape slides have a limited useful service life of about 15 years. During this time, typical escape slides must be inspected at least three times. Inspection usually includes deploying the slide, inspecting it, and repacking it. The service life of a typical inflatable escape slide is affected by (1) the wear due to the inspection and repack cycle, (2) deterioration due to exposures to an atmosphere that may contain corrosive gases, eg., jet fuel, hydraulic fuel vapors, engine exhaust, and (3) aging of the escape slide materials due to fungus growth, moisture, oxygen, ozone, smog, ultraviolet light, high temperature/low temperature cycling, and aircraft vibration.

SUMMARY OF THE INVENTION

The present invention is an environmentally-sealed vacuum packaged envelope with unique automatic deployment features. The vacuum package provides for automatic deployment of the inflatable escape slide. The present invention also provides means for mounting a $CO_2$ cylinder, for inflating the escape slide in the event of an emergency, and a battery pack, for illuminating the inflated slide, outside the vacuum packaged envelope.

The vacuum-packaged envelope is formed from pliable multi-layer gas-impermeable materials. It has an upper piece and a lower piece that are heat-sealed together along their periphery. The envelope is also sealed to and around a girt interface flange contained inside the vacuum envelope. The girt interface flange is connected to the escape slide and is the means for attaching the escape slide to the aircraft.

The vacuum envelope includes external attachment points for the tear initiator cords used to automatically rip open the vacuum envelope just prior to the inflation of the slide. The vacuum envelope also includes external attachment points for mounting the $CO_2$ gas cylinder that is used to initiate the inflation of the slide, and a battery pack that is used to power the slide's lights.

In a preferred embodiment of the present invention, the $CO_2$ cylinder is connected to an aspirator contained within the vacuum envelope using a hose assembly with a special disconnect fitting. The hose fitting is equipped with a rupture disk. It is located at the vacuum envelope interface and enables easy connection and disconnection of the $CO_2$ cylinder from the sealed slide assembly. The envelope material is sealed around the hose firing to maintain the vacuum.

As described above, the battery pack for powering the slide lights is mounted external to the vacuum envelope. The slide lights are sealed within the vacuum envelope. The battery pack and the slide lights are connected via a vacuum-tight feed-through at the interface to the vacuum envelope.

This feedthrough enables the connection and disconnection of the battery pack from the sealed slide assembly. The envelope is sealed around the feedthrough to maintain the vacuum seal.

Thus the $CO_2$ cylinder and the battery pack can be changed without compromising the vacuum packaged envelope. This eliminates the need to repack the slide whenever either the battery pack or the $CO_2$ cylinder is inspected or replaced.

The packaging procedure includes: (1) placing the folded escape slide in the vacuum envelope; (2) sealing the vacuum envelope around the girt interface flange, the hose fitting, and the electrical fitting; (3) compressing the inflatable escape slide, and evacuating the escape slide with a vacuum line; (4) disconnecting the vacuum line from the inflatable slide; (5) evacuating the envelope; and 6) sealing the vacuum envelope at its periphery.

After the slide assembly is sealed within the vacuum envelope, the battery pack and the $CO_2$ cylinder are connected to the vacuum envelope. The girt interface flange of the vacuum envelope is also connected to a length of girt material which is used to attach the vacuum envelope to the aircraft.

In the undeployed or stowed position, the vacuum packaged escape slide is mounted to the interior of the aircraft door or some area immediately adjacent thereto. Automatic deployment of the vacuum packaged evacuation slide system is accomplished by attaching the tear initiation cords to the girt assembly that is attached to the aircraft. Prior to flight, the escape slide is armed by attaching the free end of the girt to the bottom of the aircraft doorway, using the girt bar. In this armed configuration, a considerable amount of slack exists in both the girt and the tear initiator cords. The overall length of the tear initiator cords is selected such that they become fully taut just before the girt is fully taut.

As the aircraft door is opened in an emergency, the slack is pulled from the tear initiator cords and the girt. When the tear initiator cords are fully taut, they rip open the vacuum envelope. Immediately afterwards, the girt becomes fully taut, so that the girt bar pulls the folded slide assembly from the storage position. The folded slide assembly then falls under the influence of gravity between the open door and the sill. Subsequently, the slide is inflated rapidly and is ready for the evacuation of passengers within seconds of the door opening.

Tear initiation of the vacuum envelope is ensured by forming a seal area on a crease on the envelope near each of the tear initiator cord attachment points, and then cutting partway into the seal area to ensure a low tear-initiation force. The material selected for the envelope must be "notch-sensitive," i.e., the force required to propagate a tear in the material must be much lower than the force required to initiate the tear. A tear is initiated in the general area of the aspirator intake. To ensure that the envelope does not block airflow into the aspirator, or that material is not sucked inside the mouth the aspirator during inflation, the vacuum envelope material over this area is pulled away as part of the tearing scheme.

The object of the present invention is to increase the inspection/repack cycle of inflatable escape slides from the present cycle of approximately 5 years to 15 years or longer, by vacuum-packaging the escape slide to reduce the aging of the escape slide. The packaging system protects the escape slide from harmful environmental agents such as moisture, ultraviolet light, smog, oxygen, ozone, mildew, and fungus. It is anticipated that the service life of escape slides can be extended from the current 15-year period to 25 years or more.

It is another object of the present invention to provide an inflatable escape slide that does not require repacking when either the $CO_2$ cylinder or the battery pack is inspected or replaced.

It is another object of the present invention to reduce the overall dimensions of stowed inflatable escape slides.

It is another object of the present invention to reduce the labor required to pack inflatable escape slides.

These and other objects of the present invention will be apparent from the following description, the accompanying drawings, and the attached claims.

BRIEF DESCRIPTION OF THE DRAWINGS

FIG. 6a is a schematic diagram of the hose feed-through.

FIG. 6b is a schematic diagram of the rupture disk used in the hose feed-through.

FIG. 7 is a schematic diagram of the electrical feedthrough.

DETAILED DESCRIPTION OF THE INVENTION

Figure 1A:
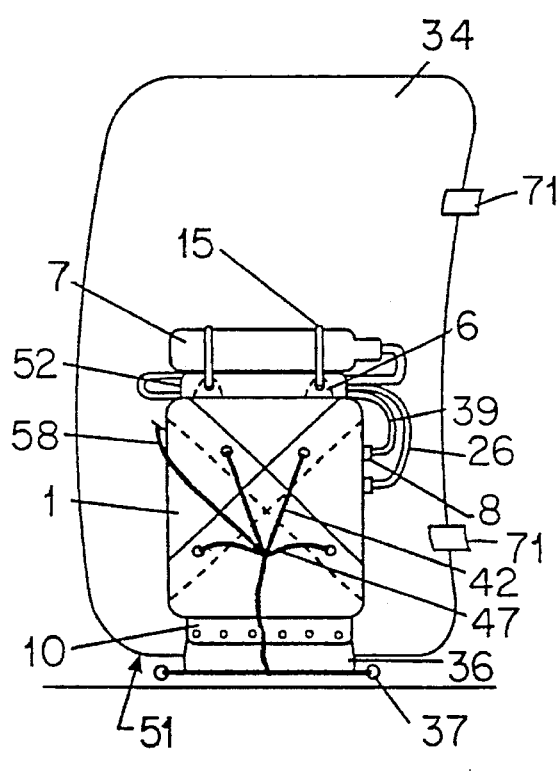
FIG. 1a is a schematic diagram of the present invention mounted on the interior surface of an aircraft door (without cover).
Figure 1B:
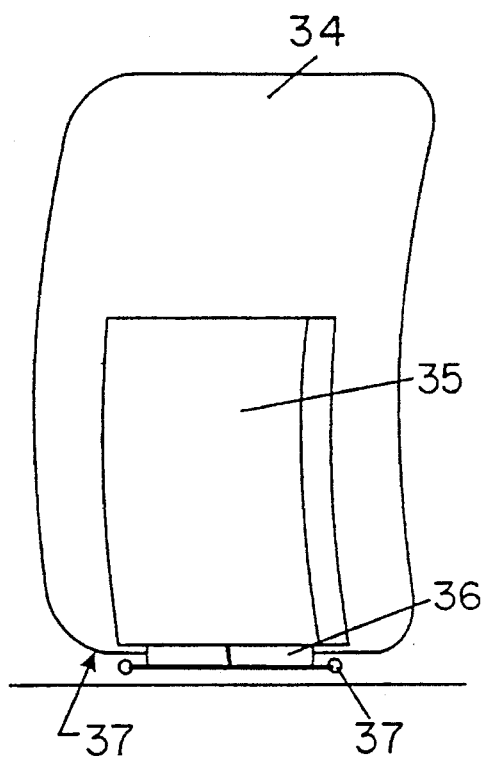
FIG. 1b is a schematic diagram of the present invention mounted on the interior surface of an aircraft door (with cover).

FIGS. 1a and 1b show the escape slide as it is installed on the interior surface of an aircraft door 34. FIG. 1a shows the escape slide without its protective covering, and FIG. 1b shows the escape slide stowed within protective covering 35. Tear initiator cords 42, 47 and 58 are attached to vacuum envelope 1 and to girt bar 37, such that when the door is opened (by swinging it horizontally out from hinges 71), the tear initiator cords rip open vacuum envelope 1 and initiate deployment of the escape slide. FIG. 1a also shows $CO_2$ gas cylinder 7 and battery pack 52 which are mounted outside the vacuum envelope, and outer girt 36, which attaches the escape slide to girt bar 37, and thus to the bottom of the doorway. Prior to each take-off, the escape slide is armed for deployment by attaching outer girt 36 and tear initiator cords 42 and 47 to the bottom of the aircraft doorway, via girt bar 37.

Vacuum envelope 1 is fabricated from pliable multi-layer gas-impermeable materials such as layers of polyester or nylon, aluminum foil, and low-density polyethylene. The preferred materials include layers of nylon, aluminum foil and low-density polyethylene. Vacuum envelope 1 could be made from of an upper piece and a lower piece, which are heat-sealed together along the periphery to form an environmentally sealed container, or it could be made from a single piece folded back on itself and sealed.

FIG. 1a shows $CO_2$ gas cylinder 7 connected to the sealed slide assembly as it would be installed under protective bustle 35. $CO_2$ gas cylinder 7 is attached to slide 5 by two straps 15 that pass around cylinder 7 and through the eye of each vacuum envelope attachment point 6. Cylinder 7 may or may not be contained within a fabric pouch (not shown).

The $CO_2$ gas in cylinder 7 is released when the door is opened in an emergency. The valve of cylinder 7 is held closed by a pin connected by a cable to girt bar 37. The cable is also connected to a fabric handle, to allow for manual inflation of the slide, if necessary. When the door is opened in an emergency, the girt bar pulls the entire slide assembly out from under the bustle 35. As the assembly falls, the pin is pulled out from the cylinder, after all slack is taken up from the cable attaching the pin to girt bar 37. The $CO_2$ gas from cylinder 7 flows into the slide 5 through hose 39. Hose 39 is connected to an aspirator 49 (described below in connection with FIG. 9c) that facilitates the inflation of slide 5. When the slide assembly is in the packed configuration, cylinder 7 is mounted outside vacuum envelope 1, while aspirator 49 is within sealed vacuum envelope 1. Feedthrough 8, described in detail in connection with FIGS. 6a–6b, is mounted in the wall of vacuum envelope 1. It allows hose 39 to pass through the wall of the vacuum envelope 1. Feedthrough 8 also provides a means for disconnecting hose 39 at the vacuum envelope interface, so that cylinder 7 can be replaced.

Figure 2:
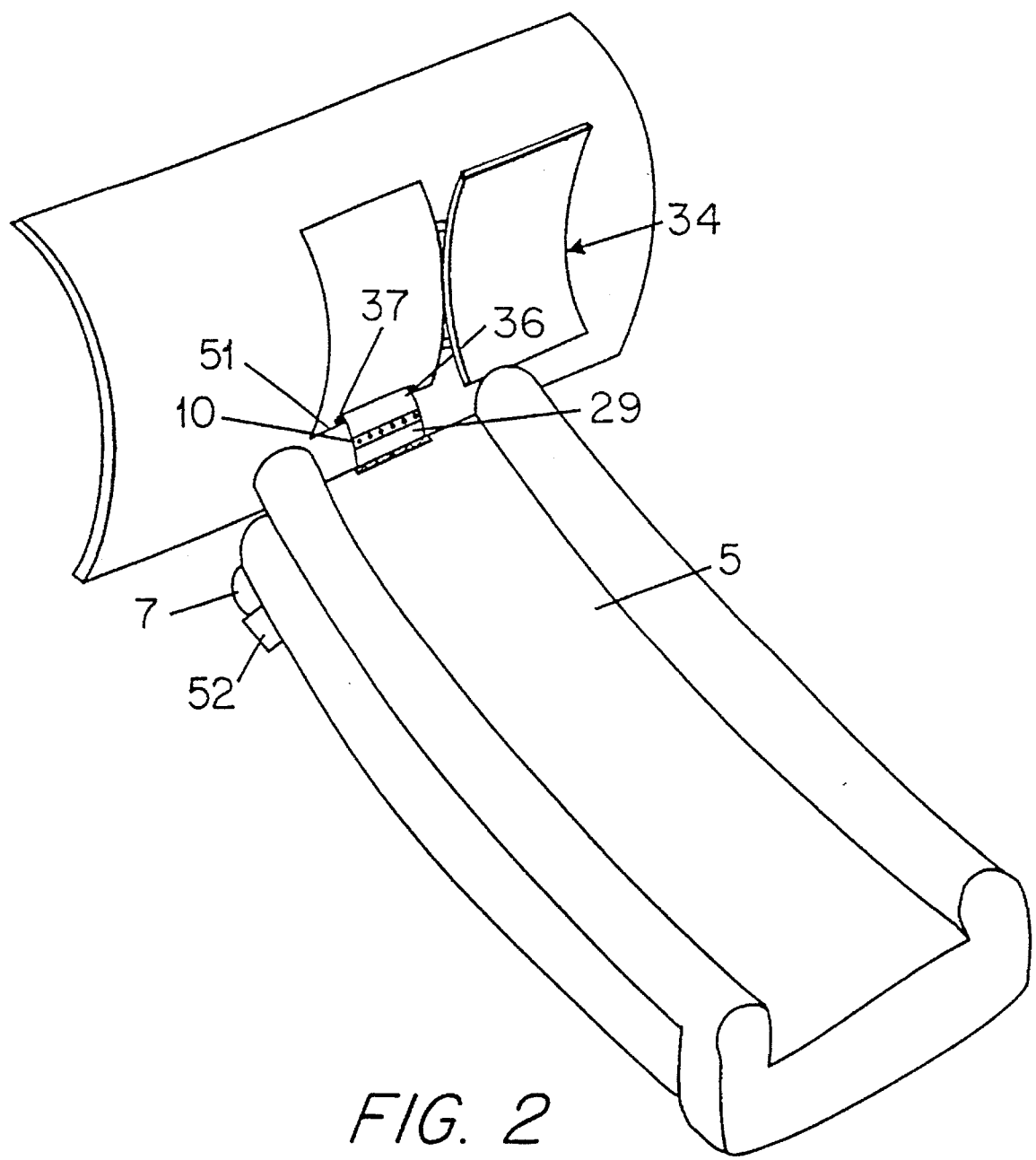
FIG. 2 is a schematic diagram of the present invention after deployment.

FIG. 2 shows inflatable escape slide 5 in its deployed position with the $CO_2$ cylinder 7 attached to the underside of escape slide 5. The top end of escape slide 5 is attached to girt bar 37, at the bottom of the airplane doorway, by outer girt 36.

Figure 3A:
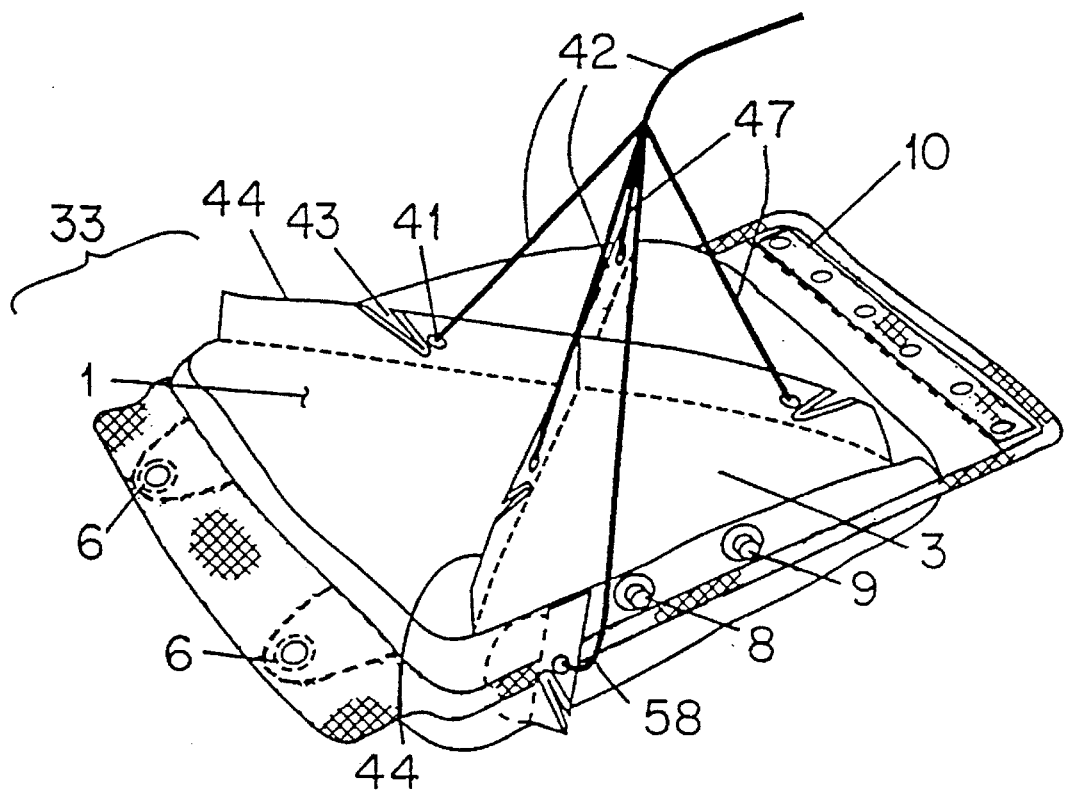
FIG. 3a is a schematic diagram of the vacuum envelope enclosing the escape slide, viewed from above.
Figure 3B:
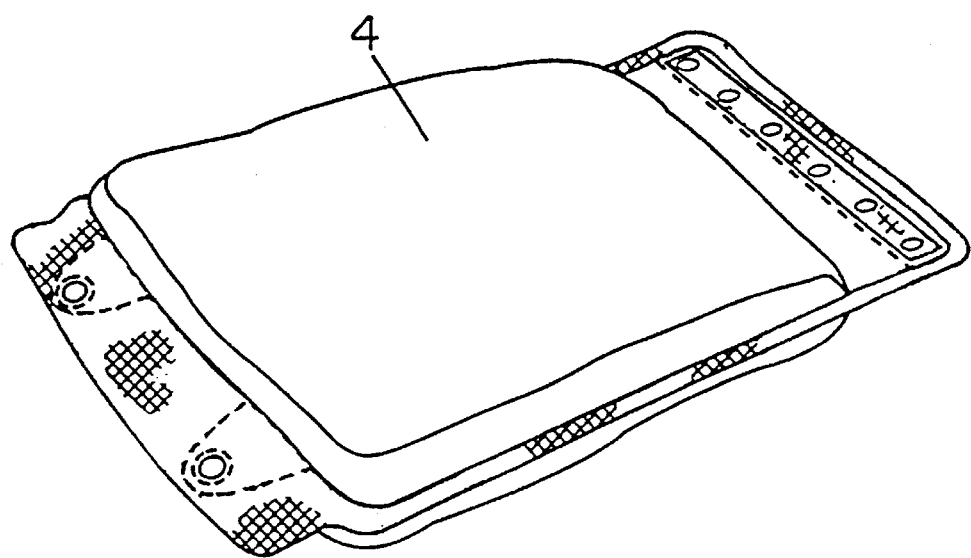
FIG. 3b is a schematic diagram of the vacuum envelope enclosing the escape slide, viewed from below.

FIGS. 3a and 3b are top and bottom views, respectively, of a folded inflatable escape slide 5 in a vacuum envelope 1. The vacuum envelope 1 is sealed to and around girt interface flange 10, hose feedthrough 8, and electrical feedthrough 9. The escape slide 5 is evacuated first, and then vacuum envelope 1 is evacuated and sealed, forming sealed escape slide assembly 33.

Vacuum envelope 1 includes several features which allow the slide assembly contained within vacuum envelope 1 to interface with the external environment without compromising the vacuum environment inside vacuum envelope 1. These features are best seen in FIG. 3a. They include two gas cylinder attachment points 6, sealed hose feedthrough 8, sealed electrical feedthrough 9, and girt interface flange 10.

FIGS. 3a and 3b show that the upper side 3 and the lower side 4 of vacuum envelope 1 also include four attachment points 41 for the upper and lower tear initiator cords 42 and 47, respectively, that are used to rip open the vacuum envelope 1. The attachment points 41 are located on flaps 44 that have been formed in the upper side 3 of vacuum envelope 1, by folding and sealing the envelope material onto itself. Similar tear initiators may be formed on the back side of the envelope, if required. FIG. 3a also shows tear initiators 43 in flaps 44.

Tear initiator cord 58 is attached to the envelope close to the mouth of aspirator 49, as explained in more detail below with reference to FIGS. 4a and 9c.

When the sealed slide assembly 33 is set in the armed configuration, as shown in FIG. 1a, one end of the tear initiator cords 42 and 47 is attached (along with the outer girt 36) to girt bar 37. In this armed configuration, a considerable amount of slack exists in both the outer girt 36 and tear initiator cords 42 and 47. However, the overall length of the tear initiator cords is selected such that the tear initiator cords become fully taut just before the outer girt is fully taut.

Figure 4A:
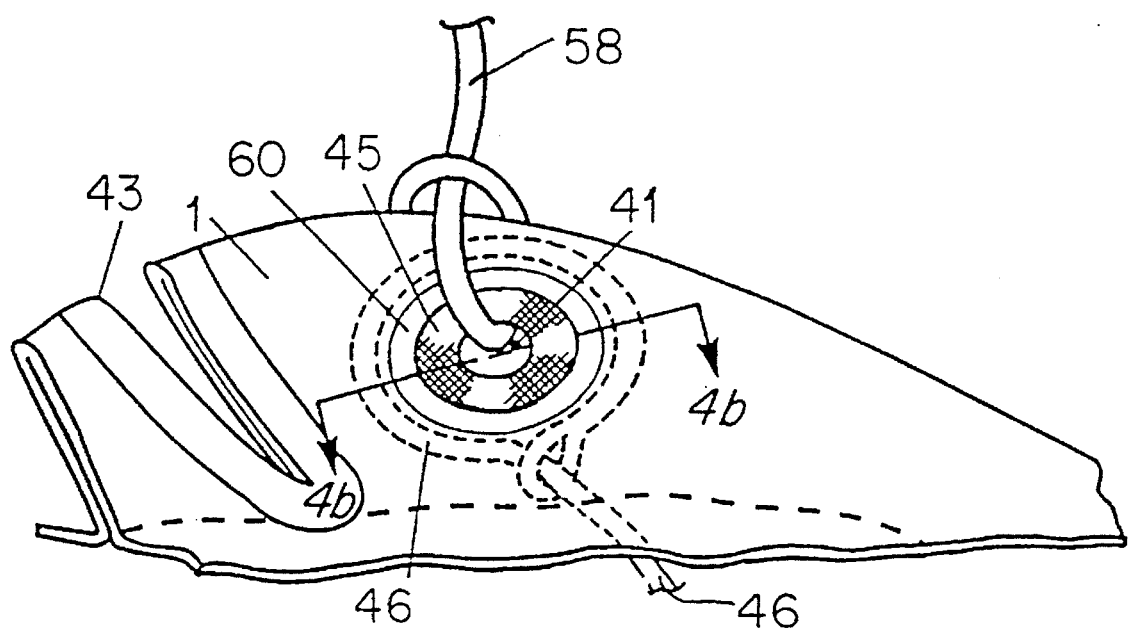
FIG. 4a is a schematic diagram of the tear initiator attachment point.
Figure 4B:
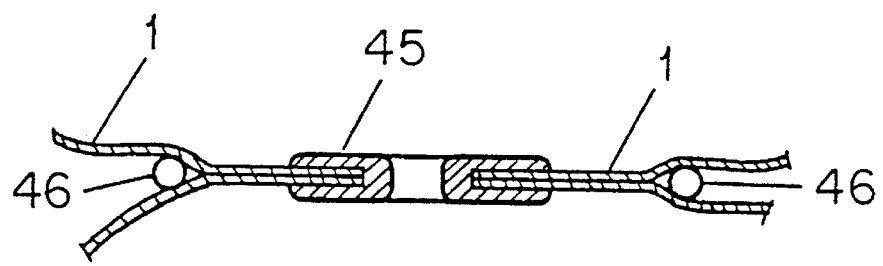
FIG. 4b is a cross-sectional view of the tear initiator attachment point.

FIGS. 4a and 4b show tear initiator attachment point 41 in detail. These Figures show the tear initiator point that is closest to the mouth of aspirator 49. FIG. 4b shows a cross-sectional view of attachment point 41, taken across the A—A line of FIG. 4a. Tear initiator cord 46 loops through circular seal 60 in the vacuum envelope 1. Circular seal 60 may be reinforced with tape and/or a metal grommet 45. A tear initiator 43 is next to each attachment point 41. Tear initiators 43 are notches formed by cutting partway into the sealed and folded area of flap 44. Tears in the vacuum envelope 1 will propagate readily from these notches because the vacuum envelope material is notch-sensitive.

Cord 46, shown in FIGS. 4a and 4b, is a tear-away cord that is only used with the one attachment point that is closest to the mouth of the aspirator 49. Tear-away cord 46 connects to tear initiator cord 58 for the purpose of tearing the envelope material away from the mouth of aspirator 49 when the vacuum envelope 1 is torn open. As shown in FIG. 4a (see also FIG. 9c below), cord 46 loops through the loop of the tear initiator cord 42. The other end of the cord 46 is attached to rigid disk 48 that has been placed inside vacuum envelope 1, directly over the mouth of aspirator 49.

The other tear initiator points are similar to the tear initiator point shown in FIGS. 4a and 4b, except that they do not include cord 46, and have cord 42 as the tear initiator cord, instead of cord 58.

In one preferred implementation of rigid disk 48, the rigid disk is manufactured with a small lip, such that the lip slips around the mouth of aspirator 49. The lip helps keep rigid disk 48 in position over aspirator 49, but does not interfere with the removal of rigid disk 48 during deployment.

Figure 5A:
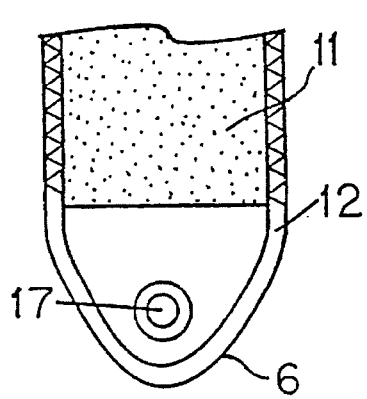
FIG. 5a shows the gas cylinder attachment point, before it has been sealed within the vacuum envelope.
Figure 5B:
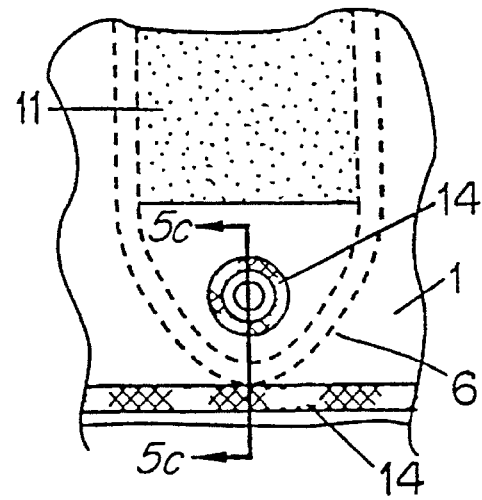
FIG. 5b shows the gas cylinder attachment point, after it has been sealed within the vacuum envelope.
Figure 5C:
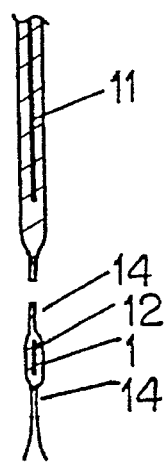
FIG. 5c is a cross-sectional view of the gas cylinder attachment point.

FIGS. 5a–5c show gas cylinder attachment point 6 in detail. FIG. 5a shows cylinder attachment point 6 before it has been sealed within vacuum envelope 1. FIGS. 5b and 5c show cylinder attachment point 6 after it has been sealed inside vacuum envelope 1. FIG. 5c shows a cross-section of the internal cylinder attachment point 6, taken across the A—A line of FIG. 5b. Attachment points 6 enable $CO_2$ cylinder 7, that is mounted outside sealed vacuum envelope 1, to be secured to the underside of the inflatable slide 5. $CO_2$ gas cylinder 7 is attached to the slide 5 via connectors 11 which are attached to the slide 5. Connectors 11 are preferably made from fabric that has webbing material 12 sewn along the edges. Excess webbing is left at the end of the fabric to form a loop. The internal cylinder attachment points 6 are connected to external cylinder attachments by creating a round heat seal in vacuum envelope 1 through the open loop of webbing. The hole through the envelope material can be reinforced to prevent tearing. The outer cylinder can then be mechanically attached through these holes. Cross-hatched shading in FIGS. 5a and 5b indicates heat seal areas 14. The vacuum envelope material covering each eye 17 is then punched out.

FIG. 6a shows hose feedthrough 8 in detail. Hose feedthrough 8 passes through a hole in the upper side of vacuum envelope 1. It is secured in place by a locking nut 18 which clamps the vacuum envelope material between metal flange 19 and locking nut 18. A gasket 20 seals the vacuum envelope 1 around the hose feedthrough 8. The gasket may be attached to the vacuum envelope with adhesive. The hose feedthrough 8 includes a rupture disk 21 that is shown in detail in FIG. 6b. Rupture disk 21 is held in place over the orifice of hose feedthrough 8 by rupture disk insert 22. Rupture disk 21 provides an airtight seal within hose 39, thus enabling $CO_2$ cylinder 7 to be changed without compromising the vacuum environment of vacuum envelope 1. When the gas cylinder 7 is triggered in an emergency, the pressure of the discharged $CO_2$ gas bursts the rupture disk 21, and the gas flows into the escape slide 5 through the hose 39.

Inflatable escape slide 5 is equipped with lights (not shown) to aid in night-time evacuations. Electricity for the lights is provided by battery pack 52 that is connected to the lights by electrical wire 26. Battery pack 52 is mounted next to $CO_2$ cylinder 7 near the underside of escape slide 5, as can be seen in FIG. 2. When escape slide 5 is stowed, battery pack 52 is mounted outside vacuum envelope 1 proximate to the $CO_2$ cylinder 7, while the slide lights are sealed within the vacuum envelope 1. Electrical feedthrough 9, mounted in the wall of vacuum envelope 1, allows wire 26 to pass through the wall of vacuum envelope 1. Electrical feedthrough 9 additionally provides a means for disconnecting battery pack 52 at the vacuum envelope interface.

FIG. 7 shows electrical feedthrough 9 in detail. Electrical feedthrough 9 passes through a hole in the side of the vacuum envelope 1. It is secured by locking nut 24 which clamps the vacuum envelope material 1 between flange 23 and locking nut 24. Vacuum envelope 1 is additionally adhesively sealed around the electrical feedthrough 9. Shading 53 in FIG. 7 indicates the adhesive seal area. Electrical feedthrough 9 includes a blind hole receptacle 25 for connecting and disconnecting battery pack 52. The electrical connector 28 of the battery pack 52 plugs into the blind hole receptacle 25. Wire 26, which connects directly to the slide lights, is soldered or crimped onto the prongs 54 of the electrical feedthrough 9. The electrical feedthrough 9 is preferably made of an engineering thermoplastic.

Figure 8A:
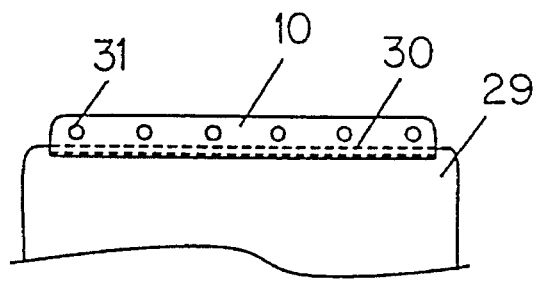
FIGS. 8a–8d are schematic diagrams of the girt interface flange.
Figure 8B:
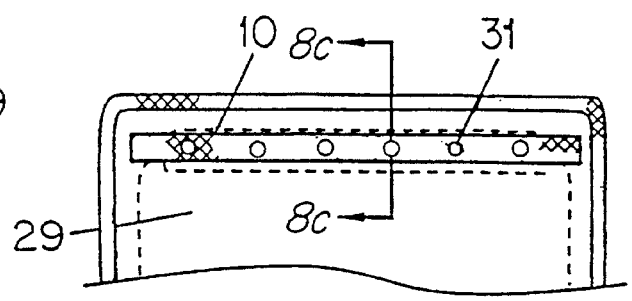
Figure 8C:
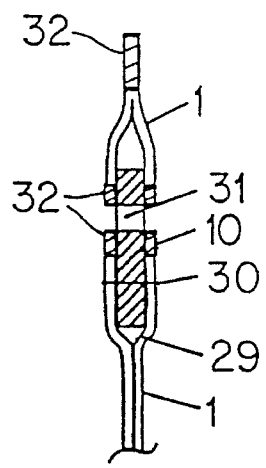

FIGS. 8a–d show girt interface flange 10 in detail. Girt interface flange 10 provides a means for attaching the sealed escape slide to the aircraft doorway. FIG. 8a shows flange 10 as it appears before it is sealed within vacuum envelope 1. FIGS. 8b and 8c show girt interface flange 10 after it is sealed within vacuum envelope 1. Girt interface flange 10 is attached to one end of an inner girt 29 by heavy-duty stitching 30. The other end of inner girt 29 is attached to the top of the inflatable slide 5, as shown in FIG. 2. Girt interface flange 10 is made of plastic, preferably one-eighth inch thick. It contains a series of eyelets 31 that facilitate the attachment of sealed escape slide assembly 33 to one end of outer girt 36 (as shown below in FIG. 9). The other end of the outer girt 36 is then attached to the aircraft via girt bar 37 (shown in FIG. 2).

FIGS. 8b and 8c show girt interface flange 10 after it has been sealed within vacuum envelope 1. The upper and lower pieces of the vacuum envelope 1 are heat-sealed together slightly beyond the outside edge of girt interface flange 10 and inner girt 29. The envelope material is also heat-sealed to the girt interface flange 10 in the area over and proximate to the eyelets 31. Shading 32 in FIGS. 8b and 8c indicates the seal area. The vacuum envelope material covering the eyelets 31 is then punched out. Eyelets 31 may be reinforced with metal grommets (not shown).

Figure 8D:
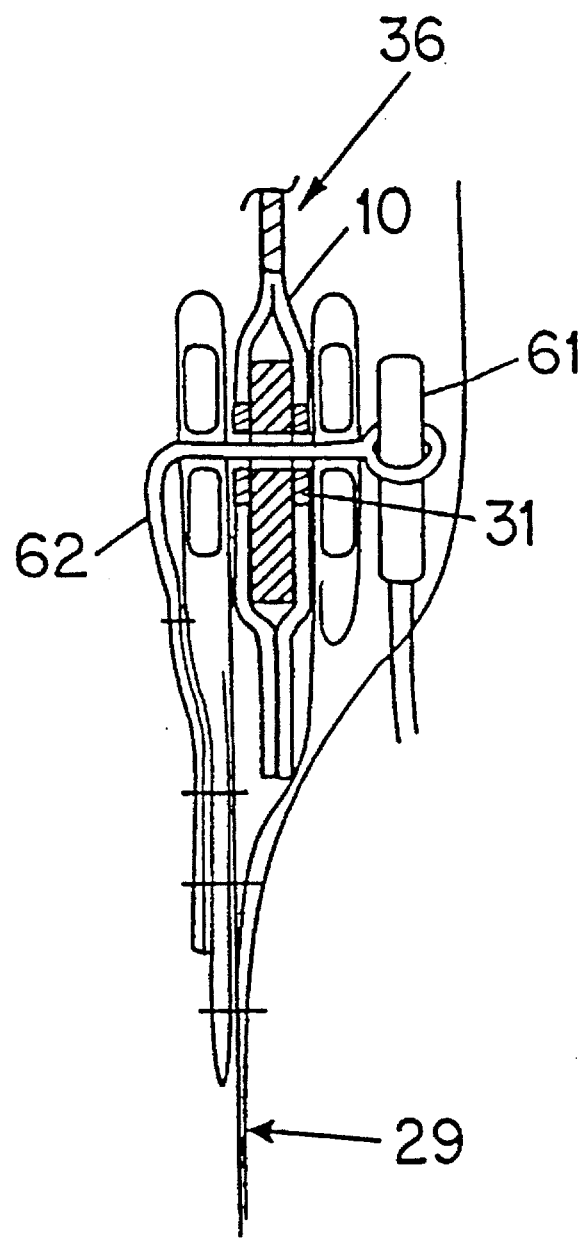

FIG. 8d is a more detailed diagram of the girt attachment between the slide and the aircraft. Outer girt 36 connects to the eyelets 31 of the girt interface flange 10 preferably using a series of loops 62 formed from nylon webbing. These loops are then passed through both the eyelets 31 and the corresponding holes in the outer girt 36. The loops are then mechanically locked with one or more steel pins 61. These pins are attached to a cable and terminated with a handle that, when pulled, unlocks the nylon loops and disconnects the slide from the aircraft. Preferably this connection can also be used as a release mechanism that disconnects the fully inflated slide from the evacuated aircraft.

Figure 9A:
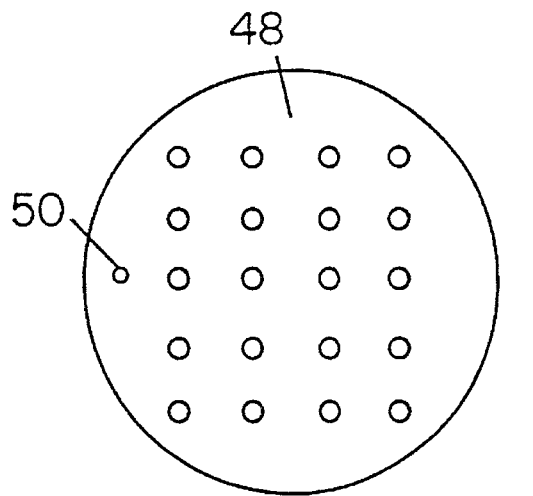
FIGS. 9a–9c are schematic diagrams of the rigid disk by itself, and of the rigid disk in the vacuum envelope.
Figure 9B:
Figure 9C:
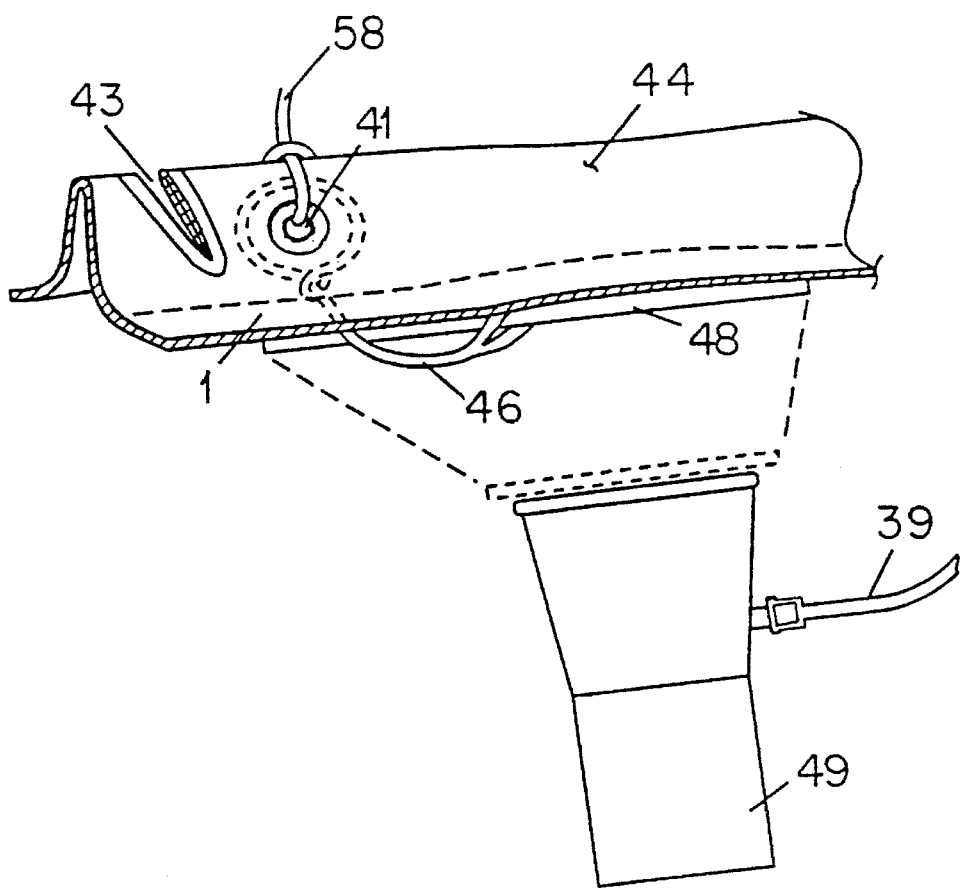

FIGS. 9a and 9b show disk 48 in detail. FIG. 9c shows rigid disk 48 inside the upper piece of the vacuum envelope 1, positioned below flap 44 and above the aspirator 49. Cord 58 is connected to the disk 48 by looping through an eye 50. Disk 48 is preferably made of plastic.

When the aircraft door is opened in an emergency, the aircraft door 34 swings horizontally outward. As the door opens, the slack is pulled from the tear initiator cords 42 and 47, and from the outer girt 36. When the tear initiator cords 42, 47, and 58 are fully taut, a force is transmitted from the girt bar 37, down the legs of the tear initiator cords 42 and 47 to the attachment points 41. The transmitted force then rips open vacuum envelope 1, propagating tears from the tear initiators 43. The tearing force is then transmitted along the cord 46 to the disk 48, which then causes the disk 48 and the surrounding envelope material to be torn away from the proximity of the mouth of the aspirator 49. Outer girt 36 then becomes fully taut, causing the folded slide assembly to pull away from aircraft door 34. Escape slide assembly then falls under the influence of gravity between the open door 34 and the door sill 51. Subsequently, escape slide 5 is inflated rapidly and is ready for evacuating passengers within a few seconds (typically 4 seconds) after the opening of door 34.

The preferred embodiment described herein uses a vacuum envelope 1 having four attachment points 41, four tear initiators 43, and two envelope tear initiator cords 42 and 47. However, other embodiments could have more or fewer attachment points 41 and tear initiators 43, and more or fewer tear initiator cords.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. An inflatable escape slide system comprising:
   (a) a vacuum packaged envelope containing an inflatable escape slide, an aspirator and at least one slide light;
   (b) means for fluidly connecting a carbon dioxide cylinder to the inflatable escape slide system;
   (c) fluid connection means for connecting the means for connecting a carbon dioxide cylinder to the inflatable escape slide system to the aspirator through a vacuum envelope interface, said fluid connection means comprising a rapture disk at the vacuum envelope interface, said aspirator being fluidly connected to the inflatable escape slide;
   (e) means for electrically connecting a battery pack through an electrical feedthrough in the vacuum envelope to the at least one slide light;

(f) a girt bar;

(g) at least one tear initiator cord, with each tear initiator cord being attached at one end to the vacuum envelope proximate to a tear initiator attachment point, and attached at the other end to the girt bar; and (h) an outer girt attached at one end to the girt bar.

2. The inflatable escape slide system of claim 1, wherein the at least one tear initiator cord is a first plurality of tear initiator cords, and said tear initiator cords are attached at one end to the vacuum envelope at the first plurality of tear initiation attachment points and are attached at the other end to the girt bar.

3. The inflatable escape slide system of claim 2, wherein the first plurality of tear initiation cords are attached to the girt bar by a single common portion of the tear initiation cords.

4. The inflatable escape slide system of claim 1, wherein the length of the at least one tear initiation cord is such that, when the escape side is being deployed, the tear initiation cords become fully taut before the outer girt is fully taut.

5. The inflatable escape slide system of claim 1, further comprising a battery pack electrically connected to the means for electrically connecting a battery pack.

6. The inflatable escape slide system of claim 1, further comprising a carbon dioxide cylinder fluidly connected to the means for connecting a carbon dioxide cylinder to the inflatable escape slide system.

7. The inflatable escape slide system of claim 1, wherein the vacuum packaged envelope comprises at least one flap, said flap comprising at least one tear initiation attachment point and at least one tear initiator point.

8. The inflatable escape slide system of claim 1, wherein the aspirator has a mouth, and wherein a rigid disk is positioned inside the vacuum envelope directly over the mouth of the aspirator.

9. The inflatable escape slide system of claim 8, wherein one tear initiation attachment point is closest to the mouth of the aspirator, and the tear initiator cord attached to the tear initiation attachment point closest to the mouth of the aspirator is attached to a tear-away cord, and wherein the tear-away cord is attached to the rigid disk.

10. The inflatable escape slide system of claim 1, wherein the vacuum packaged envelope is fabricated from notch-sensitive material.

11. An inflatable escape slide system comprising:

(a) a vacuum packaged envelope containing an inflatable escape slide, an aspirator and at least one slide light;

(b) a carbon dioxide cylinder;

(c) a hose fluidly connecting the carbon dioxide cylinder to the inflatable escape slide system to the aspirator through a vacuum envelope interface, said hose comprising a rupture disk at the vacuum envelope interface, said aspirator being fluidly connected to the inflatable escape slide;

(e) means for electrically connecting a battery pack through an electrical feedthrough in the vacuum envelope to the at least one slide light;

(f) a girt bar;

(g) at least one tear initiator cord, with each tear initiator cord being attached at one end to the vacuum envelope proximate to a tear initiation attachment point, and attached at the other end to the girt bar; and (h) an outer girt attached at one end to the girt bar.

12. The inflatable escape slide system of claim 11, wherein the at least one tear initiator cord is a first plurality of tear initiator cords, and said tear initiator cords are attached at one end to the vacuum envelope at the first plurality of tear initiation attachment points and are attached at the other end to the girt bar.

13. The inflatable escape slide system of claim 12, wherein the first plurality of tear initiation cords are attached to the girt bar by a single common portion of the tear initiation cords.

14. The inflatable escape slide system of claim 11, wherein the length of the at least one tear initiation cord is such that, when the escape side is being deployed, the tear initiation cords become fully taut before the outer girt is fully taut.

15. The inflatable escape slide system of claim 11, further comprising a battery pack electrically connected to the means for electrically connecting a battery pack.

16. The inflatable escape slide system of claim 11, wherein the vacuum packaged envelope comprises at least one flap, said flap comprising at least one tear initiation attachment point and at least one tear initiator point.

17. The inflatable escape slide system of claim 11, wherein the aspirator has a mouth, and wherein a rigid disk is positioned inside the vacuum envelope directly over the mouth of the aspirator.

18. The inflatable escape slide system of claim 17, wherein one tear initiation attachment point is closest to the mouth of the aspirator, and the tear initiator cord attached to the tear initiation attachment point closest to the mouth of the aspirator is attached to a tear-away cord, and wherein the tear-away cord is attached to the rigid disk.

19. The inflatable escape slide system of claim 11, wherein the vacuum packaged envelope is fabricated from notch-sensitive material.

20. A method for deploying an escape slide, that is packed in a vacuum packaged envelope mounted on an interior surface of an aircraft door in an aircraft doorway, from the aircraft doorway comprising:

(a) providing a carbon dioxide cylinder fluidly connected to the escape slide through a rupture disk in the vacuum packaged envelope, a girt attached to the escape slide, a girt bar attached to the girt and the doorway, and tear initiator cords attached at one end to the vacuum packaged envelope and at the other end to the girt bar;

(b) triggering the deployment of the escape slide by opening the aircraft door, (c) the step of opening the aircraft door further pulling the tear initiator cords taut, such that they rip open the vacuum packaged envelope;

(d) allowing the vacuum packaged envelope to fall out of the aircraft doorway, pulling the girt taught;

(e) the girt pulling the escape slide out of the vacuum packaged envelope; and (f) rupturing the rupture disk such that carbon dioxide from the carbon dioxide cylinder inflates the escape slide.

21. The method of claim 20, wherein the carbon dioxide cylinder is fluidly connected to the escape slide through an aspirator.

22. The method of claim 21, wherein the vacuum packaged envelope comprises a rigid disk inside the vacuum packaged envelope positioned directly above the aspirator.

23. The method of claim 22, wherein the rigid disk, and the portion of the vacuum packaged envelope is torn away before the escape slide is pulled out of the vacuum packaged envelope.

24. The method of claim 20, wherein the escape slide comprises lights, and wherein the lights are turned on as the escape slide is deployed.

25. A method for vacuum packing an escape slide for an aircraft comprising:

(a) providing an envelope having at least one flap, said flap comprising at least one tear initiator attachment point and at least one tear initiator point, said envelope also comprising a girt interface flange, a hose feedthrough and an electrical feedthrough, said hose feedthrough comprising a rupture disk, and said envelope having one rigid disk positioned inside the envelope below one flap;

(b) placing a folded escape slide in the envelope;

(c) placing an aspirator fluidly connected to the folded escape slide in the envelope below the rigid disk;

(d) sealing the envelope around the girt interface flange, the hose feedthrough and the electrical feedthrough;

(e) connecting a vacuum line to the escape slide and evacuating the escape slide;

(f) disconnecting the vacuum line from the escape slide;

(g) evacuating the envelope; and (h) sealing the envelope.

26. The method of claim 25, further comprising attaching at least one tear initiator cord to at least one tear initiator attachment point.

27. The method of claim 26, further comprising attaching a tear-away cord to the tear initiator cord attached to the tear initiator attachment point closes to the aspirator.

28. The method of claim 25, wherein the girt interface flange is attached to a girt bar by an outer girt.

29. The method of claim 28, further comprising attaching the tear initiator cords to the girt bar.

30. An envelope fabricated from gas-impermeable, notch sensitive materials comprising:

(a) at least one flap, said flap comprising a tear initiator point and a tear initiator attachment point;

(b) a girt interface flange;

(c) a hose feedthrough comprising a rupture disk;

(d) an electrical feedthrough;

(e) a rigid disk positioned inside the envelope, just below a tear initiator attachment point;

(f) an aspirator fluidly connected to the hose feedthrough positioned in the envelope below the rigid disk; and (g) an escape slide fluidly connected to the aspirator.

31. The envelope of claim 30, wherein the notch-sensitive materials are multi-layer notch-sensitive materials.

32. The envelope of claim 31, wherein the multi-layer notch-sensitive material comprises at least one material selected from nylon aluminum foil and low density polyethylene.

33. The envelope of claim 31, wherein the multi-layer notch-sensitive material comprises a layer of polyethylene.

34. The envelope of claim 31, wherein the notch-sensitive material comprises a layer of nylon, a layer of aluminum foil, and a layer of low density polyethylene.

35. The envelope of claim 30, further comprising two gas cylinder attachment points.

36. The envelope of claim 30, further comprising a girt bar attached to the girt interface by an outer girt.

37. The envelope of claim 36, further comprising at least one tear initiator cord attached at one end to a tear initiator attachment point and at the other end to the girt bar.

38. The envelope of claim 37, further comprising a tear-away cord attached to the tear initiator attachment point just above the rigid disk.

39. The envelope of claim 37, wherein the length of the at least one tear initiator cord is selected such that, were the envelope pulled away from the girt bar, the at least one tear initiator cord become taut before the outer girt becomes taut.

* * * * *